United States Patent
Nijim et al.

(10) Patent No.: US 10,484,114 B1
(45) Date of Patent: Nov. 19, 2019

(54) AUTOMATED WIRELESS LOCAL AREA NETWORKING TOPOLOGY MAPPING

(71) Applicant: Cox Communications, Inc., Atlanta, GA (US)

(72) Inventors: Yousef Wasef Nijim, Cumming, GA (US); James Alan Strothmann, Johns Creek, GA (US); Anant Pralhad Patil, Kennesaw, GA (US)

(73) Assignee: COX COMMUNICAIONS, INC., Atlanta, GA (US)

( * ) Notice: Subject to any disclaimer, the term of this patent is extended or adjusted under 35 U.S.C. 154(b) by 0 days.

(21) Appl. No.: 16/012,101

(22) Filed: Jun. 19, 2018

(51) Int. Cl.
| | |
|---|---|
| *H04W 4/021* | (2018.01) |
| *H04B 17/391* | (2015.01) |
| *H04B 17/318* | (2015.01) |
| *H04B 17/345* | (2015.01) |
| *H04L 12/24* | (2006.01) |
| *G06T 11/00* | (2006.01) |

(52) U.S. Cl.
CPC ......... *H04B 17/391* (2015.01); *H04B 17/318* (2015.01); *H04B 17/345* (2015.01); *H04L 41/12* (2013.01); *H04W 4/021* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 9,866,996 B1 * | 1/2018 | Krzych | H04L 61/308 |
| 2011/0151864 A1 * | 6/2011 | Byun | H04W 36/30 |
| | | | 455/426.1 |
| 2016/0165641 A1 * | 6/2016 | Narayanan | H04W 76/14 |
| | | | 455/404.1 |
| 2016/0321574 A1 * | 11/2016 | Peterson | G06Q 10/063 |
| 2017/0010587 A1 * | 1/2017 | Champy | G04G 15/00 |
| 2017/0228899 A1 * | 8/2017 | Witriol | G06T 11/001 |
| 2018/0018502 A1 * | 1/2018 | Rao | G06K 9/00201 |
| 2019/0025062 A1 * | 1/2019 | Young | G01S 5/0252 |
| 2019/0129444 A1 * | 5/2019 | Wirth | G05D 1/0274 |
| 2019/0141626 A1 * | 5/2019 | Ye | H04W 4/02 |
| 2019/0149768 A1 * | 5/2019 | McArdle | H04N 7/148 |
| 2019/0178638 A1 * | 6/2019 | Abovitz | G01B 11/303 |

* cited by examiner

*Primary Examiner* — Kodzovi Acolatse
(74) *Attorney, Agent, or Firm* — Merchant & Gould

(57) ABSTRACT

A system, method, and computer readable storage device are provided for collecting data associated with a WiFi signal profile of an area of interest (AOI), analyzing the collected data, and generating a dataset from the data representative of the signal profile. The dataset includes value information and location information, wherein value information include signal data that are to be displayed in a visual representation. The dataset includes values of measured WiFi signal strengths, and in some examples the values are weighted based on one or a combination of device data, interference data, and business-related data. This can enable generation and display of a visual representation that includes a representation of signal strength values based on assessed signal strengths needed to support particular services on particular user devices. The visual representation can be a heatmap that shows color-coded variations in WiFi signal values associated with locations or devices in the AOI.

20 Claims, 12 Drawing Sheets

AUTOMATED WIRELESS LOCAL AREA NETWORKING TOPOLOGY MAPPING

BACKGROUND

With advances in wireless technology, more and more devices are being developed with wireless local area networking (WiFi) capability. As service providers deliver a variety of services over WiFi, consumers expect great WiFi signal coverage across their (oftentimes many) connected devices throughout their homes. In a wireless local area network, signal coverage is seldom even. For example, when a device uses WiFi, the signals are transmitted over radio waves. Despite advanced features in wireless technology, interferences can happen, which can result in a weak or unreliable wireless connection. For example, the signals received by a wireless device can be negatively impacted by distance from a router or access point, physical obstructions, certain surfaces and materials, appliances that send wireless signals, electrical equipment that may generate interference, other WiFi networks, or other obstacles.

To support some types of services that rely on fast download speeds, a reasonably strong signal may be needed. For example, a consumer's experience of his/her broadband Internet service may be determined by the WiFi performance on a wireless network. Poor WiFi performance may result in symptoms such as intermittent connectivity, unexpected disconnections, delays in connection and data transfer, and slow network speeds. In some examples, the power draw of WiFi enabled devices increases when WiFi signal strength is poor, which can lead to inefficient battery power usage. To ensure that a strong signal needed to support online or wireless services is provided everywhere needed in an area of interest, it is important to select an optimal place for the router and to configure the connected devices in a way that will give the best results.

With a proliferation of WiFi enabled devices being used in homes and as consumers depend more on more on being connected to the web, being able to assess and visualize a WiFi signal profile of an area of interest is a technical problem for which a technical solution is needed when positioning WiFi enabled devices for optimal performance.

SUMMARY

Aspects of the present disclosure provide a technical improvement to the performance of computing devices connected to a WiFi network in an area of interest by assessing a signal profile of the area of interest and generating a visual representation of the signal profile for configuring the computing devices for optimization of WiFi performance in the area of interest. A system, method, and computer readable storage device are provided that collect various data associated with an area of interest, such as an indication of a location of a wireless router, signal strength measurements and locations of the measurements in the area of interest, an identification of user devices in the area of interest, the devices' locations, and an indication of interference sources in the area of interest. The collected data are assessed, signal values based on signal strength measurements, locations, interferences, and business-related data are computed, and a visual representation of the signal values overlaid on a layout image of the area of interest is generated for display.

According to an aspect, additional data can be collected, such as information about wireless services used on a particular device (which can be used to identify bandwidth-intensive activities for which a stronger WiFi signal strength may be needed to support) and business-related data corresponding to Internet or video services provided to the area of interest. In some examples, collected signal data can be weighted according to collected service-related data, and the visual representation can indicate signal strength values based on particular services used on particular user devices. In various implementations, the visual representation is a heatmap that shows color-coded variations in WiFi signal values associated with locations or devices in the area of interest. For example, the visual representation can be used to provide information needed to configure user devices in the area of interest such that WiFi performance can be optimized.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure enable an improvement of the performance of computing devices connected to a WiFi network in an area of interest based on generation and analysis of a visual representation (e.g., a map or layout) of an area of interest, wherein the visual representation comprises signal strength data associated with a WiFi network overlaid on the visual representation. In various implementations, the WiFi signal performance data are represented as colors. Various locations within the area of interest are assigned a color value based on WiFi signal performance, wherein determining WiFi signal performance values at specific locations is based at least in part on measured signal strength values. In some implementations, WiFi signal performance values are further based on supported applications or services. In some implementations, WiFi signal performance values are further based on measured or assessed signal interference values.

In various implementations, connected devices in the area of interest are additionally identified and located on the visual representation. According to an aspect, the visual representation is configured to dynamically update upon receiving an indication of movement of a connected device in the area of interest.

In various implementations, the visual representation is configured to dynamically update upon receiving an indication of a user selection to filter the visual representation. For example, a user can select to display signal performance values based on specific supported applications or services.

In various implementations, the visual representation is configured to display a determined recommended layout of at least one location of a connected device in the area of interest based on a determination of the location having signal performance values that are within a range sufficient for supporting a particular application or service.

According to an aspect, the visual representation provides information for configuring connected devices for optimization of WiFi performance in the area of interest. With optimized WiFi performance, connected devices can benefit from the following technical improvements: improved usability, enhanced reliability, energy savings, and a reduction of processing resources required when reacting to poor WiFi reception, such as the processing resources required for discarding incomplete packets and waiting for them to be resent over a poor-quality analog signal.

Figure 1:
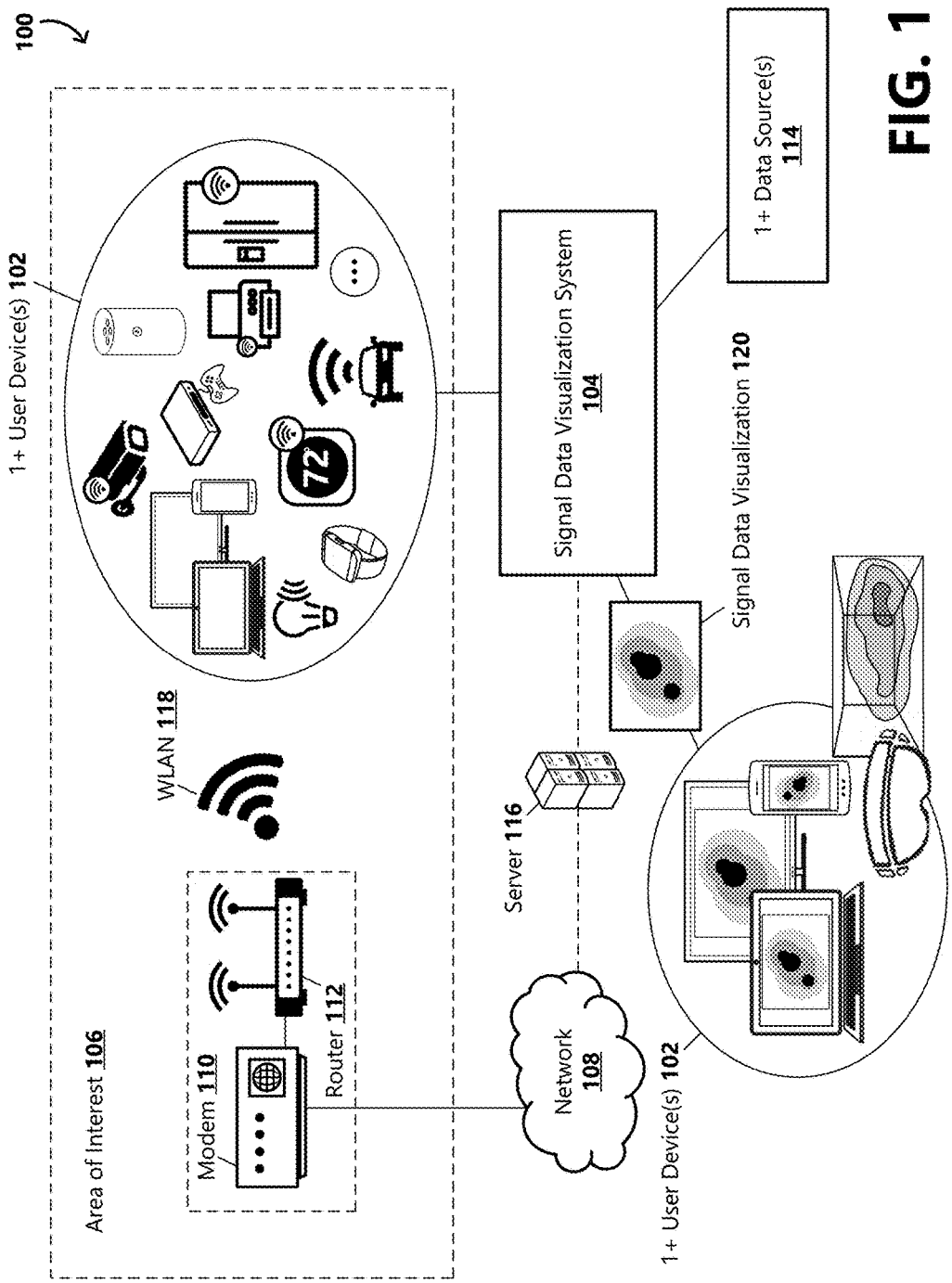
FIG. 1 is a block diagram of an example environment in which a system of the present disclosure can be implemented.

FIG. 1 is a block diagram of an example environment 100 in which the present disclosure can be practiced. As shown in FIG. 1, a signal data visualization system 104 is in communication with one or a plurality of data sources 114a-n (collectively or individually referred to as data source 114), one or a plurality of user devices 102a-n (collectively or individually referred to as user device 102), and optionally a cloud server 116. The signal data visualization system 104 is illustrative of a software module, system, or device operative to generate and provide a visual representation 120 of WiFi signal performance data corresponding to an area of interest 106 for display on a user device 102. For example, the WiFi signal performance data can provide information for configuring wireless user devices 102 in the area of interest 106 for optimizing WiFi performance of the wireless user devices.

Figure 7:
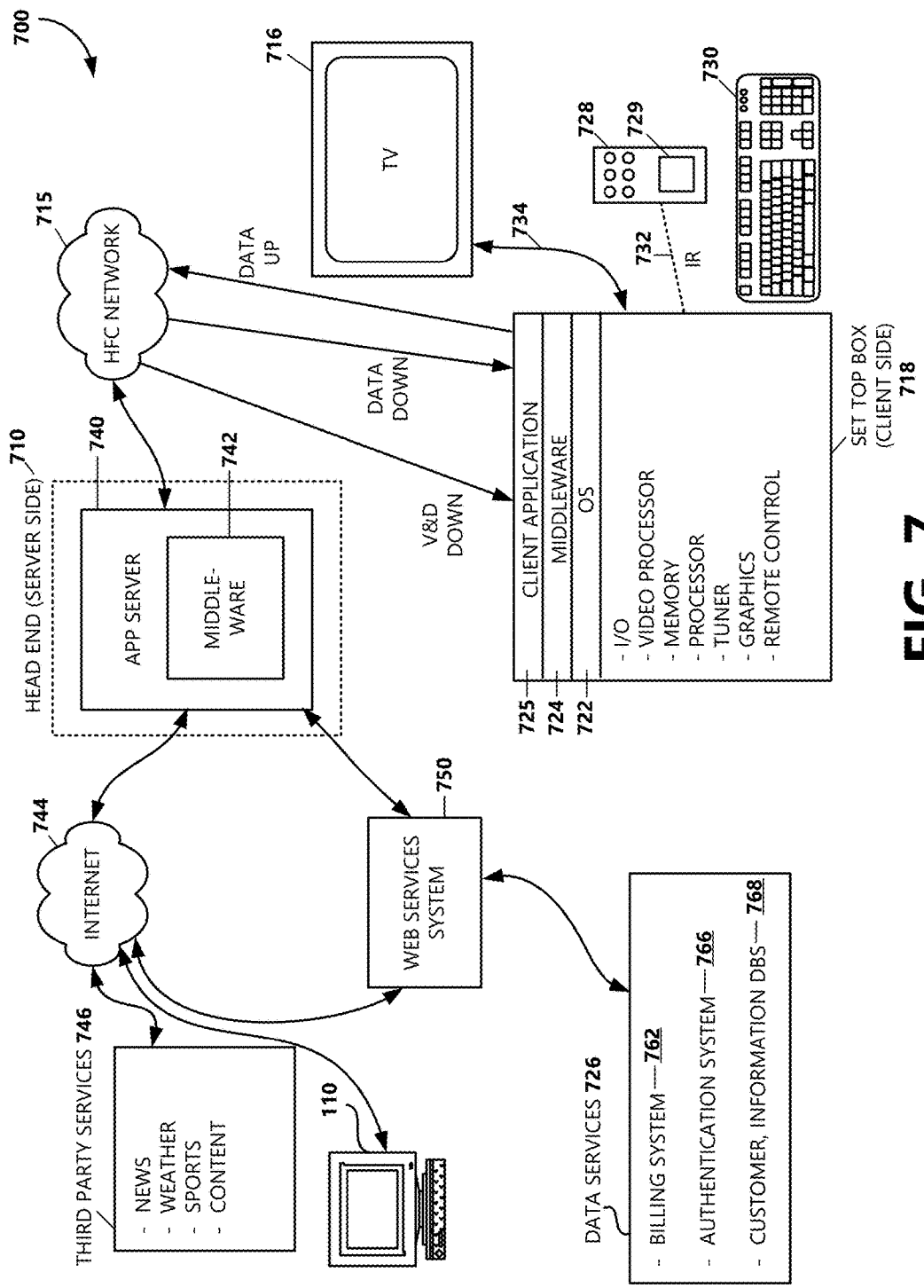
FIG. 7 is a block diagram illustrating components of a cable services system architecture providing an example operating environment according to aspects of the present disclosure.

As used herein, the term "area of interest" 106 is used to describe a location or area, such as a room, home, office, building, property, etc., that includes a wireless local area network (WLAN) 118 (e.g., WiFi network) provided by a wireless router 112 via which WiFi-compatible user devices 102 connected to the network can connect to other devices on the network and to the Internet (network 108) for networking with other devices based on the IEEE 802.11 communications standards. The network 108 can encompass a variety of network types including, but not limited to, the Internet, an intranet, an extranet, local-area networks, wide-area networks, fiber-coax networks, public switched telephone networks, global telephone networks, etc., and combinations thereof. An example cable television (CATV) architecture that can serve as one example of a network 108 via which Internet service can be provided is illustrated in FIG. 7 and is described below.

The WLAN 118 in the area of interest 106 includes a modem 110 and a router 112, wherein the router creates a network between connected devices 102 in the area of interest, and the modem connects that network, and thus the computers on it, to the Internet (network 108). For example, the modem 110 is a piece of networking equipment that plugs into the Internet service infrastructure (e.g., cable, telephone, satellite, or fiber), and includes a standard Ethernet cable output that can be plugged into a router 112 or into a connected device 102) for providing an Internet connection to the router or connected device. In some examples, the router 112 is a stand-alone device that connects to an Ethernet port on the modem 110, and "routes" networking/internet traffic to its connected devices 102. In other examples, the router 112 is integrated with the modem 110. According to an aspect, the router 112 is operable to send and receive networking traffic from the modem 110 with one connection, and route that data through its Ethernet ports and through the air via 2.4 GHz and 5 GHz frequency spectrums.

The illustrated example environment 100 includes multiple user devices 102. As should be appreciated, fewer or more user devices 102 may be included in an area of interest 106. The one or more user devices 102 may include various types of wirelessly connected user devices such as a mobile phones, smart phones, tablet computers, laptop computers, wearables, hand-held devices, set-top boxes, gaming consoles, smart televisions, streaming media players, connected appliances, connected speaker devices, connected automobiles, home automation devices, security devices, printers, etc. The user devices 102 may include various antennas and receivers/transmitters adapted for specific types of wireless communications. For example, the user devices 102 may be adapted to communicate using WiFi standards, specifically including 802.11 communications standards. In some examples, the user devices 102 may also be configured to communicate using Bluetooth®. Details of the computing devices and variations thereof can be found in FIGS. 5, 6A, 6B, and 7.

In some examples, the signal data visualization system 104 is implemented via a client-server architecture where a client device (e.g., user device 102) has an application running locally that performs a set of functions that require communication with a server (e.g., cloud server 116) in order to support desired functionality (e.g., analysis of collected data and generation of a visual representation 120 of WiFi signal performance data). The client application can be configured to allow users to input a desired request of the application and/or to input data on which WiFi signal performance is based, which is sent to the server for processing. Additionally, the client application can be configured to allow users to view a generated visual representation 120 of WiFi signal performance data corresponding to an area of interest 106. In some examples, the client application is a guide application that can display a generated visual representation 120 of WiFi signal performance data corresponding to an area of interest 106 in addition to an onscreen program guide of channels. As will be appreciated, the cloud server 116 and the one or more data sources 114 may be part of a distributed system and composed of a multitude of individual computing systems, and multiple user devices 102 may be in communication with the signal data visualization system 104.

According to an aspect, the signal data visualization system 104 is configured to receive data from the one or more data sources 114, wherein the data are used by the signal data visualization system to determine WiFi signal performance in an area of interest 106 and to characterize the WiFi signal performance in a visual representation 120 of the area of interest. The one or more data sources 114 can be embodied as various types of devices, applications, services, data stores, or sensors. For example, a connected user device 102, the cloud server 116, a document accessed by the signal data visualization system 104, a data entry component of a user interface that receives user input, a database or service managed by a third party that is available on the Internet or on the WLAN 118, etc., can operate as a data source 114 to the signal data visualization system. In some examples, a data source 114 is operative to provide (to the signal data visualization system 104) data sensed by a sensor (e.g., camera, GPS, accelerometer, gyroscope, thermometer, pressure sensor) integrated in or communicatively attached to the data source 114. In some implementations, a data source 114 is part of a connected user device 102, such as a hard drive local to the connected user device. In some implementations, a user may designate a data source 114 via the signal data visualization system 104. In some examples, receiving input data can include requesting data of the specified data type from the application, and receiving the input data from the application via inter-process communication. The one or more data sources 114 provide data to the signal data visualization system 104, such as layout or map data, user device data, signal data, interference data, business data, and user inputs. Data provided by the one or more data sources 114 are described in further detail below.

Figure 2:
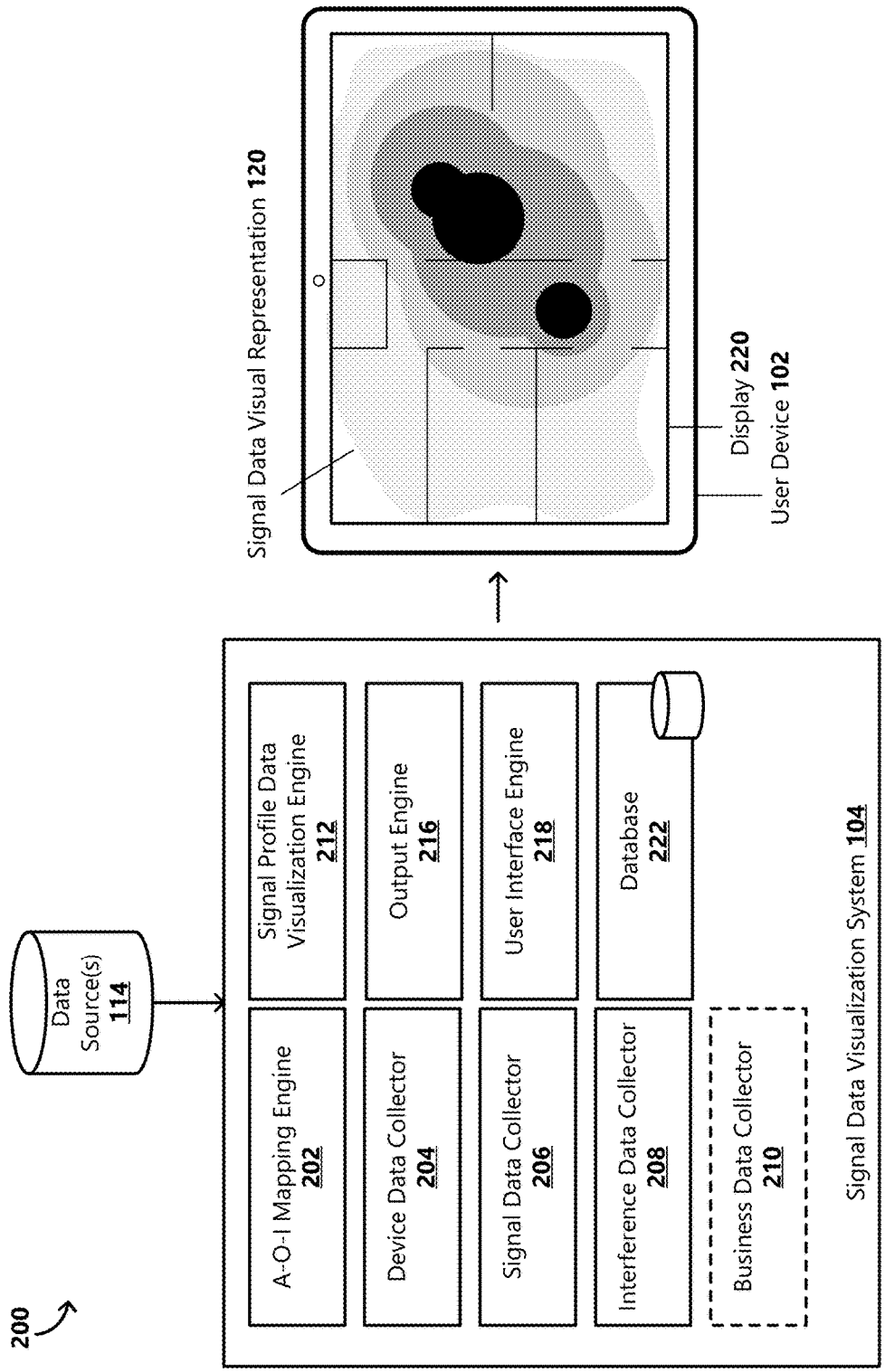
FIG. 2 is a block diagram of components of an example embodiment of a signal data visualization system for generating a visual representation of a signal profile for optimizing WiFi performance in an area of interest.

With reference now to FIG. 2, a block diagram of components of an example embodiment of a signal data visualization system 104 is provided. As illustrated in FIG. 2, the example embodiment of the signal data visualization system 104 includes an area-of-interest mapping engine 202 illustrative of a software module, system, or device operative or configured to define or map the area of interest 106 for establishing a background image onto which to apply a heatmapped dataset corresponding to WiFi signal performance.

In some implementations, the area-of-interest mapping engine 202 is operative to access a layout image, such as a two-dimensional map, three-dimensional map, a two-dimensional projection of a three-dimensional map, a topographic map, a photographed image, a virtually-live image, a floorplan, a schematic, etc. An accessed layout image may be provided to the signal data visualization system 104 by a data source 114 operating as a layout data source. In some examples, the area-of-interest mapping engine 202 can be configured to request a layout image from a data source 114 via an application programming interface (API). For example, the area-of-interest mapping engine 202 may make an API call to a third-party application or service, such as a maps service, a layout or floorplan mapping service, etc. In other examples, the area of interest mapping engine 202 is operative to receive one or a plurality of captured images (e.g., captured via a camera) as layout images from a data source 114. For example, a user may selectively capture an image of the area of interest 106 using a camera integrated in or communicatively attached to a user device 102, and may select to transmit the captured image to the signal data visualization system 104.

In some examples, a layout image accessed by the area-of-interest mapping engine 202 includes coordinates, which enables the signal data visualization system 104 to position dataset values corresponding to WiFi signal performance against the layout image so that WiFi signal performance value information can be shown in context to the area of interest 106 in the signal data visual representation 120. Examples of coordinates include latitude and longitude coordinates, Cartesian coordinates, polar coordinates, addresses, location identifiers that can be correlated to coordinates or ranges of coordinates, etc.

In other examples, a layout image accessed by the area-of-interest mapping engine 202 may not include coordinates. In such examples, the area-of-interest mapping engine 202 is operative to communicate a request for coordinate data to allocate to the accessed layout image. For example, a user can be prompted by the area-of-interest mapping engine 202 to position a user device 102 with an integrated or communicatively attached GPS system at certain locations in the area of interest 106, such that coordinates at those locations can be identified and provided to the area-of-interest mapping engine 202. That is, a user device 102 with an integrated or communicatively attached GPS system (and optionally other sensors) can be used as a data source 114 to provide coordinate data to the area-of-interest mapping engine 202 corresponding to positions and physical features, such as walls, floors, ceilings, etc., in the area of interest 106. The area-of-interest mapping engine 202 can be further configured to allocate received coordinate data to the accessed layout image.

In other implementations, the area-of-interest mapping engine 202 is operative to generate a layout of the area of interest 106 from user input received via a data entry component of a user interface. For example, the area-of-interest mapping engine 202 may be configured to operate as a floorplan tool that enables the user to draw a layout of the area of interest 106 or to modify preloaded floorplans to correspond to the area of interest. In some examples, the area-of-interest mapping engine 202 operating as a floorplan tool can provide a gallery of architectural features (e.g., walls, doors, stairs, and windows) that the user can insert in the layout. The user can be prompted by the area-of-interest mapping engine 202 to position a user device 102 with an integrated or communicatively attached GPS system at certain locations in the area of interest 106 corresponding to locations in the generated layout, such that coordinates at those locations can be identified and provided to the area-of-interest mapping engine 202 for allocation to the generated layout of the area of interest.

In other implementations, the area-of-interest mapping engine 202 is operative to generate a layout of the area of interest 106 from received or detected coordinate data. For example, the signal data visualization system 104, by means of the area-of-interest mapping engine 202, may prompt the user to move a user device 102 with an integrated or communicatively attached GPS system through the area of interest 106 (e.g., around the perimeter of the area of interest or around the perimeter of a sub-area of interest, such as a room within a house), wherein the user device is configured to track the relative position and motion of the user device and transmit coordinate data corresponding to the relative position and motion of the user device to the area-of-interest mapping engine 202. In some examples, the user device can include and utilize other sensors, such as an accelerometer, gyroscope, magnetometer, etc. to track the relative motion of the user device 102 as the user moves through the area of interest 106 for collecting coordinate data to generate the layout of the area of interest. In some examples, user input can be received via a data entry component of a user interface that can be applied to the coordinate data or layout. For example, the user may define certain sub-areas of interest (e.g., rooms) in the area of interest 106, walls, or other physical features of the area of interest. In some implementations, the area-of-interest mapping engine 202 is operative to determine, based on coordinate data, a layout image (and associated settings, such as zoom and rotation) to use as a background image onto which to apply a heatmapped dataset corresponding to WiFi signal performance. According to an aspect, the accessed or generated layout and corresponding coordinate data are stored in a database 222.

With reference still to FIG. 2, the example embodiment of the signal data visualization system 104 includes a device data collector 204 illustrative of a software module, system, or device operative or configured to collect data associated with devices in the area of interest 106 that generate the WiFi signals (e.g., the router 112), data associated with WiFi-enabled devices (e.g., user devices 102) that are connected to the WLAN 118, and data associated with WiFi-enabled devices (e.g., user devices 102) that the user intends to connect to the WLAN (and to position in the area of interest based at least in part on being provided with information on the WiFi signal performance in the area of interest 106). Device-related data may be provided to the signal data visualization system 104 by one or more data sources 114 operating as device data sources, and may be stored in the database 222.

In some examples, the router 112 operates as a device data source that provides information about itself to the signal data visualization system 104. For example, the device data collector 204 may request information from the router 112 such as information about the router's coverage or range, frequency bands over which the router is operative to communicate, which wireless protocols the router uses, location of the router, maximum connection speed, etc. In other examples, device-related data associated with the router 112 is entered or selected by the user via a user interface associated with the signal data visualization system 104.

In some examples, a connected user device 102 operates as a device data source that provides information about itself to the signal data visualization system 104. For example, the device data collector 204 may request or be automatically provided device-related information from a connected user device 102, such as a device identifier, information about the type of device (e.g., a connected printer, a desktop computer, a connected light bulb, a video streaming device), location of the device, types of data services or applications supported by the device, data services or applications commonly used on the device, etc. Location of the user device 102 may be determined by a GPS system integrated with or communicatively attached to the user device. In some examples, if the user device 102 is moved to another location in the area of interest 106, the user device is configured to communicate its new location to the signal data visualization system 104. In other examples, the device data collector 204 is operative to recurrently request location data from identified user devices 102 in the area of interest 106, wherein the user devices provide location data in response to the requests. Any user device location changes can be updated in the database 222. In other examples, at least a portion of the device-related information can be entered or selected by the user via a user interface associated with the signal data visualization system 104, transmitted to and received by the device data collector 204, and stored in the database 222. For example, a connected user device 102 may not be GPS-enabled, and the user may input the location of the device into the signal data visualization system 104 via the user interface, which is communicated to the device data collector 204.

As mentioned above, device-related information can include information about services or applications (e.g., web browsing, emailing, voice over IP (Internet Protocol), streaming audio, IP TV, streaming video, gaming, file sharing, surveillance, home automation services) supported by a connected user device 102. For example, this information can include information about services or applications that the connected user device 102 can provide wirelessly, which can be enable the signal data visualization 104 to determine a minimum or operable signal strength needed to support the services or applications and/or an amount of bandwidth a connected device 102 may expect to use. For example, a connected device 102 in the area of interest 106 may be an Internet-connected smart lightbulb that is low-bandwidth intensive and only needs a data connection to turn on or off, change color, change brightness, etc. Thus, a WiFi signal strength needed to communicate with the smart lightbulb may be less than a WiFi signal strength needed to sustain a connected device supporting data-heavy activities, such as media streaming, downloading games, high-definition IP TV streaming, etc. In some examples, a connected user device 102 can notify the device data collector 204 about a current application or service being provided wirelessly by the device. For example, this service-related data can be used to generate a real-time (or near real-time) visual representation of the WiFi signal profile of the area of interest 106.

With reference still to FIG. 2, the example embodiment of the signal data visualization system 104 includes a signal data collector 206 illustrative of a software module, system, or device operative or configured to collect signal data associated with the WLAN 118 in the area of interest 106 and to store the signal data in the database 222. For example, the signal data collected by the signal data collector 206 can be used as dataset values corresponding to WiFi signal performance. According to an aspect, signal data associated with the WLAN 118 can be measured and provided to the signal data collector 206 via one or more data sources 114 operating as signal data sources. In some examples, one or more connected user devices 102 in the area of interest 106 operate as signal data sources. For example, one or more connected user devices 102 in the area of interest 106 can comprise an integrated or installed signal strength meter (e.g., hardware instrument or software application) operative to measure the WiFi signal levels received by the one or more devices at their locations in the area of interest. The WiFi radio signal levels may be measured in decibels (dB) and signal data provided to the signal data visualization system 104 can include an identification of the WLAN 118 and the strength of its signals as values in decibels. Signal data can include additional information, such as network identifying information (e.g., network SSID).

In some examples, a connected user device 102 operating as a signal data source is GPS-enabled, such as a mobile phone, a tablet device, or other mobile GPS-enabled device. Accordingly, the user device 102 is operative to determine coordinates of its location, and thus coordinates of the location at which WiFi signal measurements are taken. The user device 102 can provide the WiFi signal measurements and the associated location information (e.g., coordinates) to the signal data collector 206.

In other examples, a connected user device 102 operating as a signal data source is not GPS-enabled. In such examples, the user device may measure WiFi signal levels and provide those measurements to the signal data collector 206 in a communication. The signal data collector 206 is able to identify, from communication metadata, the sender (user device 102) of the signal measurements, and can associate the measurements with the location of the identified user device based on device-related data (e.g., device identifier and location data) collected by the device data collector 204 and stored in the database 222. For example, a wireless video streaming device may not be GPS-enabled, but may be able to measure WiFi signal levels and transmit those signal measurements to the signal data collector 206. The user may have previously provided device-related information to the device data collector 204, including the location of the wireless video streaming device in the area of interest 106. Accordingly, when signal data are provided by the wireless video streaming device, the measurements can be correlated with the location of the wireless video streaming device.

In some examples, a data source 114 operating as a signal data source can be a dedicated device for measuring WiFi signals, wherein the device comprises a WiFi signal strength meter and a GPS system. For example, the user or a technician can use a particular mobile device operating as a signal data source to measure WiFi signal levels at various locations throughout the area of interest 106 (e.g., the user or technician moves through the area of interest with the signal data source) to take signal measurements, to determine coordinates of the locations at which the measurements are recorded, and to provide the measurements and associated coordinates to the signal data collector 206, which stores the measurements and associated location data in the database 222.

With reference still to FIG. 2, the example embodiment of the signal data visualization system 104 includes an interference data collector 208 illustrative of a software module, system, or device operative or configured to collect interference data associated with the area of interest 106 and to store the interference data in the database 222. Interference data can include signal interference-related information (e.g., identification of possible sources of signal interference, measured interference data), structural information (e.g., types of materials, surfaces, or physical obstructions in the area of interest 106), as well as other types of information related to the environment of the area of interest 106 that can cause radio frequency interferences on the wireless network. According to examples, radio frequency interference can be caused by a physical obstruction or by an unwanted signal that occurs at the same time and frequency as a data signal. For example, interference to wireless networks may come from a variety of sources, such as other wireless devices (e.g., baby monitors, garage door openers, wireless phones), appliances (e.g., as microwaves, refrigerators), other proximate WiFi networks, etc. Radio frequency interference causes wireless receivers in connected user devices 102 to sporadically make mistakes when decoding packets, which results in retransmissions of data. This disrupts the flow of data and degrades quality of service. For example, when interference occurs, users of wireless IP phones may likely experience dropped calls, browsing the web may be slow, and when streaming movies on a connected television, lost synchronization between a picture and sound may be common, as well as varying picture quality and long pauses while the video stream re-buffers.

Interference data can be provided to the interference data collector 208 via one or more data sources 114 operating as interference data sources. In some examples, a data source 114 operating as an interference data source is embodied as a spectrum analyzer or a device comprising or in communication with a spectrum analyzer operative to measure the amplitude (usually in dBm) of signals over a particular range of frequencies and to provide the measured signals to the signal data visualization system 104. The measured amplitudes may represent a combination of signals coming from data traffic on the WLAN 118 and interfering signals coming from other sources. The data source 114 may include a GPS system, which enables the data source to provide location data with the measured signal data.

In other examples, interference data provided to the interference data collector 208 can include user-input interference information. For example, user-input interference information can include a selection or entry of possible sources of signal interference, such as other wireless devices, appliances, other WiFi networks, structural information (e.g., types of materials, surfaces), physical obstructions (e.g., walls, floors, trees, furniture) in or associated with the area of interest 106. Location information (e.g., coordinates, selection of a location in a layout or background image of the area of interest 106) associated with the interference information can also be input or detected and provided to and received by the interference data collector 208 and stored in the database 222.

In some implementations, the data visualization system 104 includes a business data collector 210 illustrative of a software module, system, or device operative or configured to collect business-related data associated with services (e.g., Internet service, video service, security service) provided to the area of interest 106. In some examples, business-related data includes data corresponding to a particular Internet service level that is provided to the area of interest 106. For example, subscribers of a particular Internet service level may be provided a certain level of bandwidth or a maximum rate at which data can be downloaded from the Internet (network 108) to a computer in the area of interest 106.

In some examples, business-related data includes data corresponding to a particular tier of video service that is provided to the area of interest 106 (e.g., according to a subscription). For example, subscribers of a particular video service tier may be provided certain types of content that require certain levels (additional) bandwidth, such as 4K UHD (ultra-high definition) content (e.g., video content with a horizontal screen display resolution of approximately 4,000 pixels). Given that a stronger signal strength can be correlated with higher data transfer speeds, connected user devices 102 located in areas that have a strong signal strength in the area of interest may be enabled to support certain bandwidth-intensive services (e.g., streaming 4K UHD content), while connected user devices located in areas that have a weaker signal strength in the area of interest may be unable to support certain bandwidth-intensive services.

In some examples, business-related data is input by the user via a user interface associated with the signal data visualization system 104. In other examples, business-related data is provided to the business data collector 210 by a billing system responsive to a request for the data. Other types of business-related data can be collected by the business data collector 210. According to an aspect, the business data collector 210 stores the received business-related data in the database 222.

With reference still to FIG. 2, the signal data visualization system 104 further comprises a signal profile data visualization engine 212 illustrative of a software module, system, or device operative or configured to analyze the collected data and to generate, from the collected data, a dataset to be heatmapped, wherein the dataset is representative of the signal profile of the area of interest 106. According to an aspect, the dataset includes value information and location information, wherein value information include those data that are to be displayed to the user in the signal data visual representation 120. Additionally, location information provide context for the value information and enable the signal data visualization system 104 to position the value information against a background so that that value information are provided in context to the background in the signal data visual representation 120. In some implementations, the signal profile data visualization engine 212 is operative to generate a layer encoded with the value information, wherein a system of color-coding is used to represent different values in the signal data visual representation 120. For example, WiFi signal data can be represented using a varying set of colors ranging from cool (e.g., weak WiFi signal strength) to hot (e.g., strong WiFi signal strength).

In various aspects, a WiFi signal profile can include one or a combination of: layout data, signal strength data, location information, connected user device information, services-related information, router information, business information and rules, and environmental or interference information. According to examples, the dataset is comprised of WiFi signal strength measurements and location information or coordinates associated with the measurements, wherein the signal profile data visualization engine 212 correlates a value-color spectrum to the dataset such that a layer can be rendered and applied to the layout image of the area of interest 106 to show the dataset in a heatmap visualization on that layout image. For example, the layer can be encoded with the WiFi signal strength measurements from the dataset organized according to the location information.

In various implementations, the dataset includes interference data. For example, the dataset can include signal interference measurements and locations associated with the interference measurements, or the signal profile data visualization engine 212 can assign interference values to identified interference sources (e.g., according to interference data collected by the interference data collector 208) in the area of interest 106. Interference values can be associated with certain interference sources based on the sources and estimated amounts of signal interference caused by the sources (e.g., an identified brick wall may be assigned a particular interference value, while a microwave oven may be assigned another interference value). These interference values can be correlated with a value-color spectrum such that a layer can be rendered and applied to the layout image of the area of interest 106 to show the interference values in a heatmap visualization on the layout image. For example, WiFi signal interference can be represented using a varying set of colors ranging from cool (e.g., low interference) to hot (e.g., high interference). The layer can be encoded with the interference values from the dataset organized according to the location information.

In various implementations, the dataset includes bandwidth values corresponding to the minimum bandwidth needed to reliably support particular applications or services. For example, to support video streaming of a high-definition stream, a connected device 102 may need at least a 5 Mbps connected. Based on device data collected by the device data collector 204, these bandwidth values can be associated with particular user devices 102 in the area of interest 106. According to an aspect, bandwidth values can be applied as weights to WiFi signal strength measurements in the dataset. For example, based on a particular service (e.g., being used, is oftentimes used, or can be provided by a user device 102) and the bandwidth intensity of the service (represented by a bandwidth value), the signal profile data visualization engine 212 can increment or decrement the signal value associated with the user device or location of the device.

As an example, consider that a WiFi signal strength measurement is taken proximate to a connected lightbulb, and the measurement is a value that may be considered weak (in comparison to other collected WiFi signal strength values in the area of interest 106). Accordingly, the signal profile data visualization engine 212 may correlate this signal value with a particular color value from the value-color spectrum for representing the signal value in the signal data visual representation 120. However, based on an assessed bandwidth level needed to provide/support certain services (e.g., turn on and oft change color, change brightness), a bandwidth value can be applied as a weight to the signal value that increments the signal value to account for the minimal bandwidth and minimal signal strength that may be required for enabling the lightbulb to provide the identified services. Accordingly, another color value from the value-color spectrum can be correlated with this weighted signal value, which can indicate that the measured signal level value is adequate for provide the identified services.

As another example, a WiFi signal strength measurement is taken proximate to an IP TV, and the measurement is a value that may be considered between average and strong (in comparison to other collected WiFi signal strength values in the area of interest 106). Accordingly, the signal profile data visualization engine 212 may correlate this signal value with a particular color value from the value-color spectrum for representing the signal value in the signal data visual representation 120. However, based on collected business data that indicates that a video services subscription associated with the area of interest 106 provides for streaming of 4K UHD content and based on collected device data that indicates that the IP TV is streaming 4K UHD content or is commonly used for streaming 4K UHD content, a bandwidth value can be applied as a weight to the signal value that decrements the signal value to account for the additional bandwidth and signal strength that may be required for enabling the IP TV to provide the 4K UHD streaming services. Accordingly, a particular color value from the value-color spectrum can be correlated with this weighted signal value, which can indicate that the measured signal level value may not be adequate for provide the identified service (e.g., streaming 4K UHD content).

According to an aspect, the dataset is structured such that the values represented in the dataset can be filtered based on a desired view of the data (e.g., represented in the signal data visual representation 120). In some examples, the dataset can be filtered for displaying only measured WiFi signal strengths in the area of interest 106. In other examples, the dataset can be filtered for alternatively or additionally displaying interference data. In other examples, the dataset can be filtered for alternatively or additionally applying bandwidth weights to the signal strength measurements for displaying the adequacy of signal strengths corresponding to particular services provided on particular user devices 102.

In other examples, the dataset can be filtered for alternatively or additionally identifying locations in the area of interest 106 where WiFi signal strengths are adequate for supporting a particular user device 102 (e.g., based on services provided via that user device). As can be appreciated, the dataset can be filtered in various other ways for representing signal profile data.

According to an aspect, the signal profile data visualization engine 212 is further operative to overlay a generated layer encoded with value information and correlated color-coding of the value information on the layout image of the area of interest 106 based on location data to develop a combined layout. According to an aspect, this combined layout can be transmitted by an output engine 216 of the signal data visualization system 104 to a user device 102 for rendering the layout as a signal data visual representation 120 on a display 220. In some examples, the output engine 216 may store the combined layout in the database 222.

In various implementations, user interface tools are provided to enable the user to manipulate the data or the visual representation 120, wherein user interface tool functionality is provided by a user interface engine 218. The user interface engine 218 can be configured to receive user inputs received via user interface tools or via the user interface associated with the signal data visualization system 104, and to communicate those inputs to the signal profile data visualization engine 212 for manipulating the data or the visual representation 120. For example, the user interface tools can enable the user to modify or manipulate the collected by the area-of-interest mapping engine 202, the device data collector 204, the signal data collector 206, the interference data collector 208, or the business data collector 210, or to the outputs generated by the signal profile data visualization engine 212. In one example, the user may implement a user interface tool to determine and display one or more locations in the area of interest 106 for locating or re-locating a user device 102, for example, based on measured WiFi signal strengths and bandwidth needs of the user device for supporting certain services provided via that user device. The user is enabled to use the one or more determined locations to configure devices in the area of interest 106 for optimal WiFi signal performance. In another example, the user may implement a user interface tool to modify the combined layout.

Figure 3A:
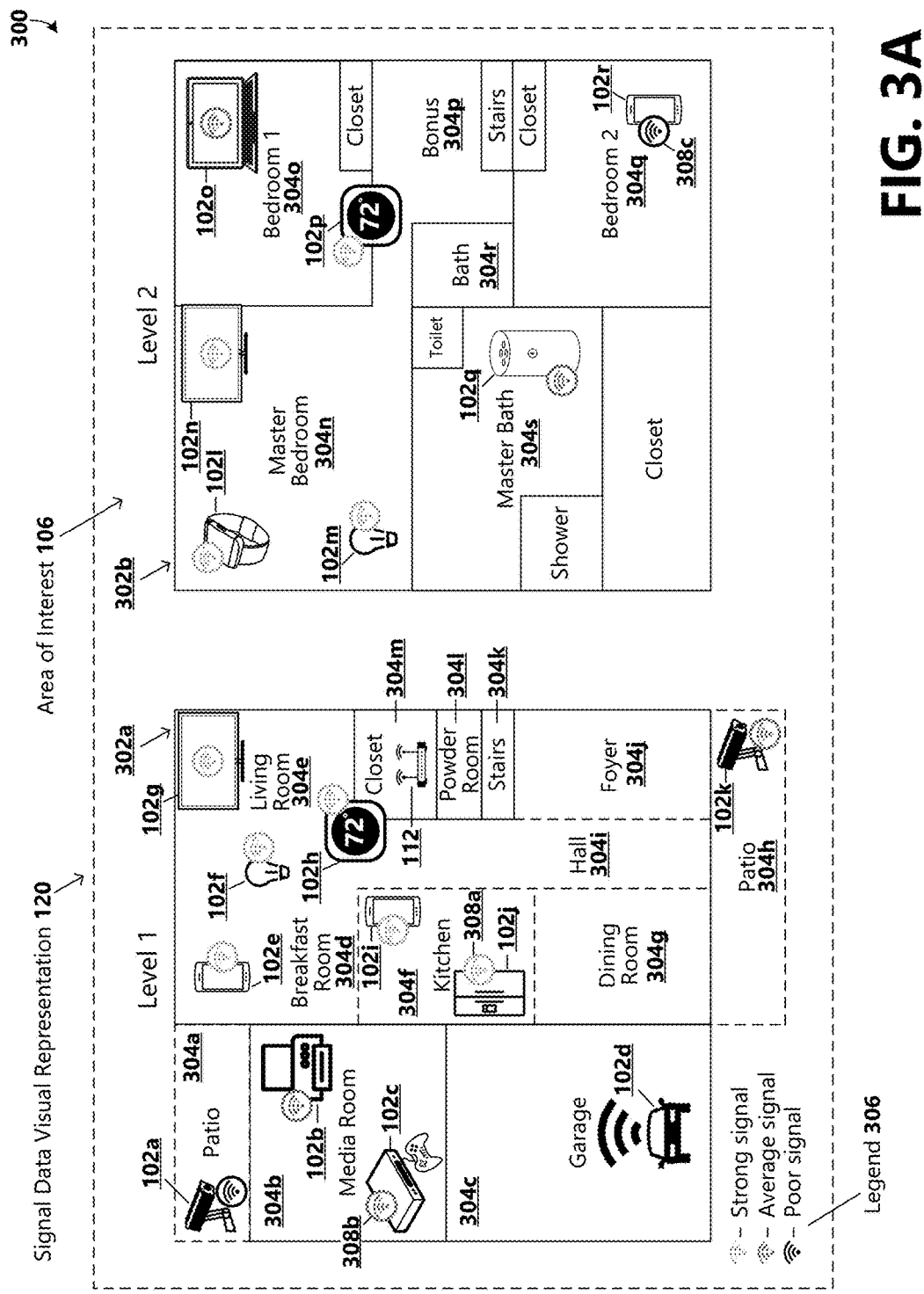
FIG. 3A is an illustration of one example of a signal data visual representation of WiFi signal performance data corresponding to an area of interest.

With reference now to FIG. 3A, an illustration of one example 300 of a signal data visual representation 120 of WiFi signal performance data corresponding to an area of interest 106 is provided. The signal data visual representation 120 is an example of a 2D map, and can be rendered on a display 220 of a user device 102. According to the illustrated example 300, the signal data visual representation 120 includes two layout images 302*a,b* of the area of interest 106: a first layout image 302*a* representing a first level of a residence and a second layout image 302*b* representing a second level of the residence. The layout images 302*a,b* (collectively or individually referred to as layout image 302) may be uploaded to the area-of-interest mapping engine 202, added via communication with a map or layout service (e.g., via an API), created via a floorplan tool provided by the area-of-interest mapping engine, or provided via another method. As illustrated in FIG. 3A, rooms or sub-areas of interest 304*a-s* (collectively or individually referred to as sub-areas of interest 304) may be defined in the area of interest 106.

Additionally, the router 112 and wireless user devices 102*a-r* (collectively or individually referred to as user devices 102) in the area of interest 106 can be identified, and information about the router and devices (e.g., device identifiers, information about the types of devices, locations of the devices, types of data services or applications supported by the devices, data services or applications commonly used on the devices) can be manually or automatically collected by the device data collector 204. As illustrated, based on an identification of the user devices 102 and the devices' locations, representations of the user devices 102 can be included in the signal data visual representation 120 and displayed at their relative positions in the represented area of interest 106.

According to an aspect, value information associated with WiFi signal strength data can be correlated with color-coding and represented in a layer and applied to the layout images 302. One example of a representation of color-coded value information is illustrated in FIG. 3A, wherein strengths of WiFi signals are represented in relation to the connected user devices 102 in the area of interest 106. In the illustrated example 300, WiFi signal strength values are represented by wireless symbols 308 displayed in a specified color (or shade). In some examples, a specific color, shade, or gradient can be associated with a specific range of WiFi signal strengths (e.g., green is associated with values within a range of strong signal strengths, yellow is associated with values within a range of average signal strengths, and red is associated with values within a range of poor signal strengths).

In some implementations, the WiFi signal strength data represented in the signal data visual representation 120 are reflective of signal strength measurements taken in the area of interest 106. In other implementations, the WiFi signal strength data represented in the signal data visual representation 120 are reflective of weighted signal strength measurements. For example, the value information associated with WiFi signal strength data can be weighted based on one or a combination of: a particular service (e.g., being used, is oftentimes used, or can be provided by a user device 102), the bandwidth intensity of the service, and interference data. In some examples, a legend 306 can be provided for information about the color-coding.

Figure 3B:
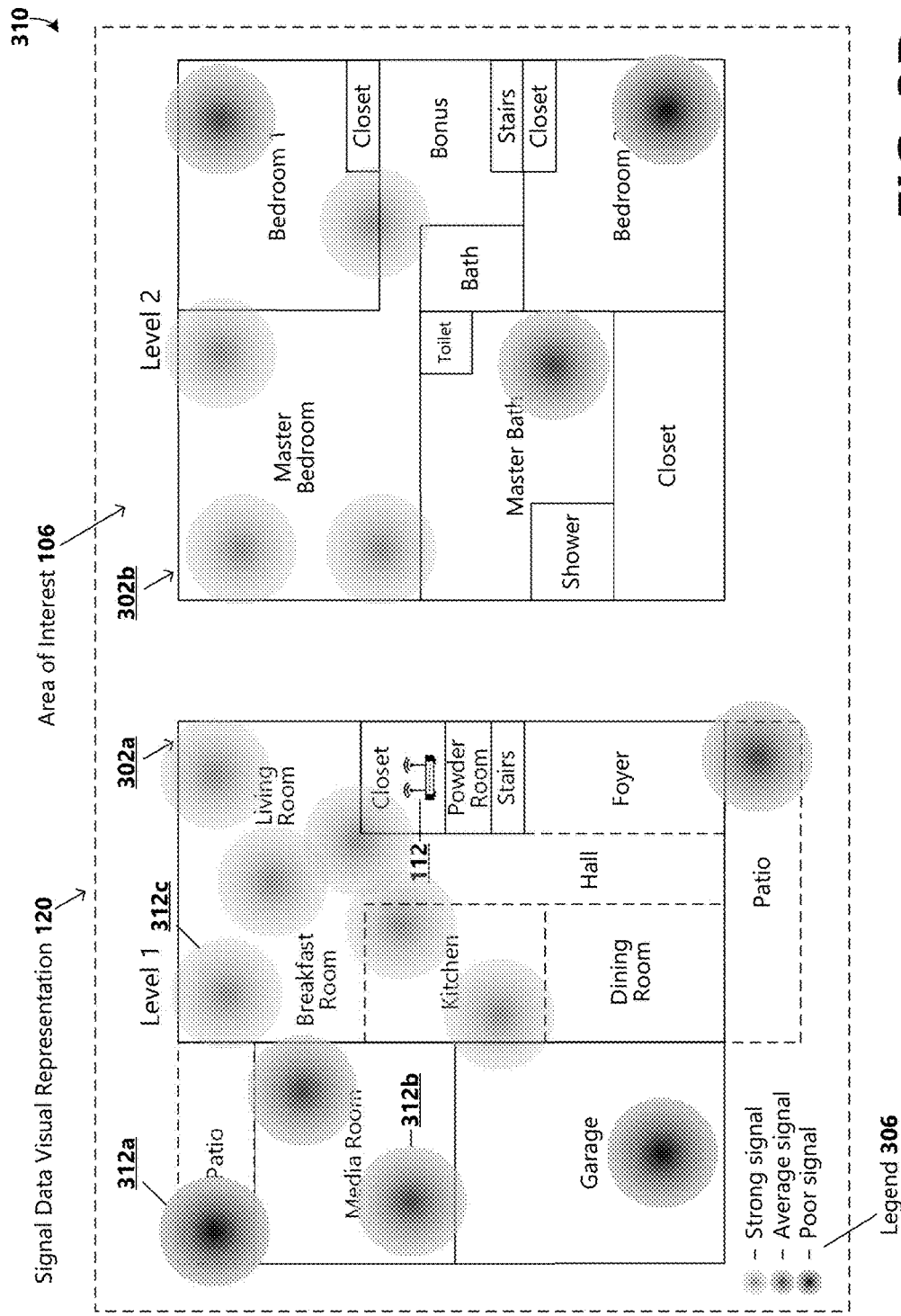
FIG. 3B is an illustration of another example of a signal data visual representation of WiFi signal performance data corresponding to an area of interest.

With reference now to FIG. 3B, an illustration of another example 310 of a signal data visual representation 120 of WiFi signal performance data corresponding to an area of interest 106 is provided. In the illustrated example 310, strengths of measured or measured and weighted WiFi signals are represented as a plurality of color-coded symbols 312*a-c* overlaid on the layout images 302. The color-coded symbols 312 may be positioned at locations where corresponding WiFi signal strength measurements were taken and/or positioned at locations of wirelessly connected user devices 102 in the area of interest 106.

Figure 3C:
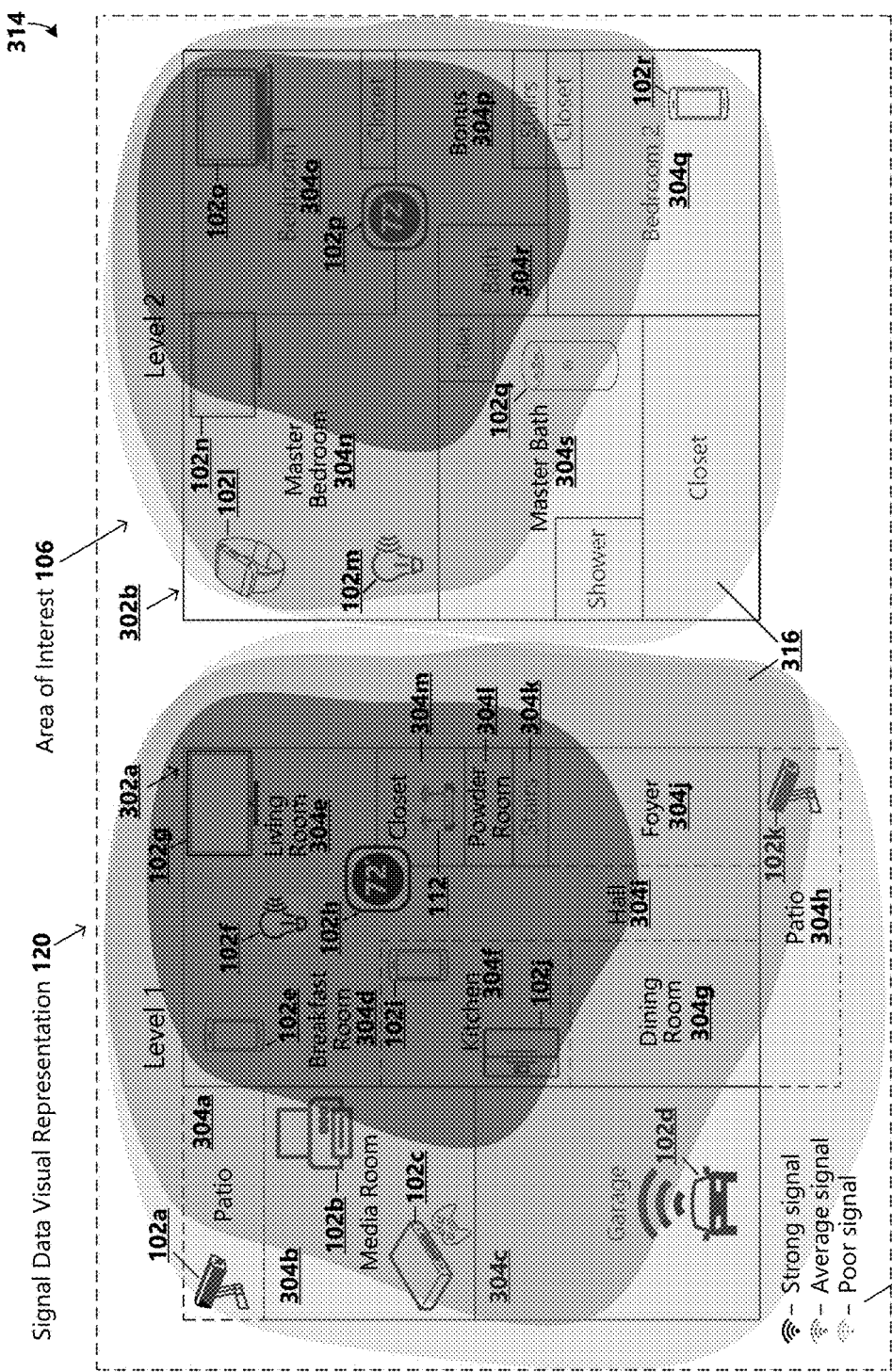
FIG. 3C is an illustration of another example of a signal data visual representation of WiFi signal performance data corresponding to an area of interest.

With reference now to FIG. 3C, an illustration of another example 314 of a signal data visual representation 120 of WiFi signal performance data corresponding to an area of interest 106 is provided. In the illustrated example 310, WiFi signal strength values are represented by a heatmap 316 comprised of a layer or overlay of various values of colors from a color spectrum that correlate to values in a WiFi signal dataset and are positioned over the layout image 302 according to location information associated with the values. For example, areas in the area of interest 106 where strong WiFi signal strengths are measured may be displayed in a specified color (or shade), such as a dark or warm color or shade, areas where weak or poor WiFi signal strengths are measured may be displayed in a specified color/shade, such as a light or cool color or shade, and areas where average WiFi signal strengths are measured may be displayed in a specified color/shade between the color/shade of the strong signal strengths and the color/shade of the weak signal strengths.

Figure 3D:
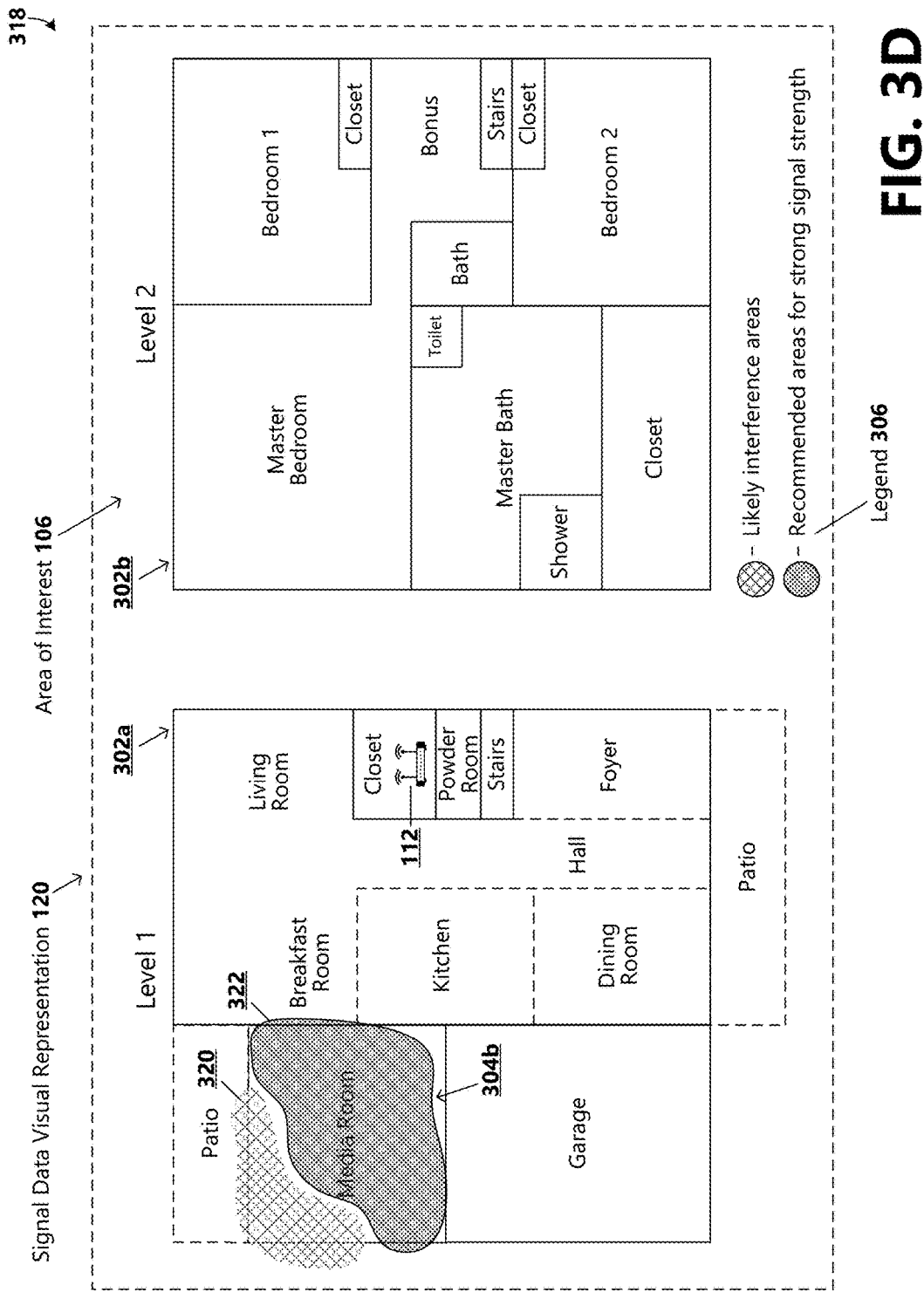
FIG. 3D is an illustration of an example of a signal data visual representation including interference-related data.

With reference now to FIG. 3D, an example 318 of a signal data visual representation 120 including interference-related data is provided. As described above, a variety of interference data can be collected by the interference data collector 208 and applied to the data. In some implementations, interference-related data can be used to show areas in the area of interest 106 (or in a sub-area of interest 304b as illustrated) where there is signal interference 320 (e.g., as measured) or where signal interference is likely. For example, certain areas may be determined to likely have signal interference based on input interference data, such as a specification of architectural features (e.g., walls, floors, structures, building materials), trees, as well as certain materials or surfaces, such as brick surfaces, steel structures, reflective surfaces, etc.

In some implementations, interference-related data can be used in association with signal strength data to provide information to the user about areas in the area of interest 106 (or in a sub-area of interest 304b as illustrated) where WiFi signal performance can be optimized. For example, responsive to a request for a recommended location to position a particular wireless user device 102, the signal data visual representation 120 can include a display of a suggested location 322. The suggested location 322 can be determined based on measured signal strengths, interference data, and in some examples, based on a particular application or service supported by the user device 102.

Figure 3E:
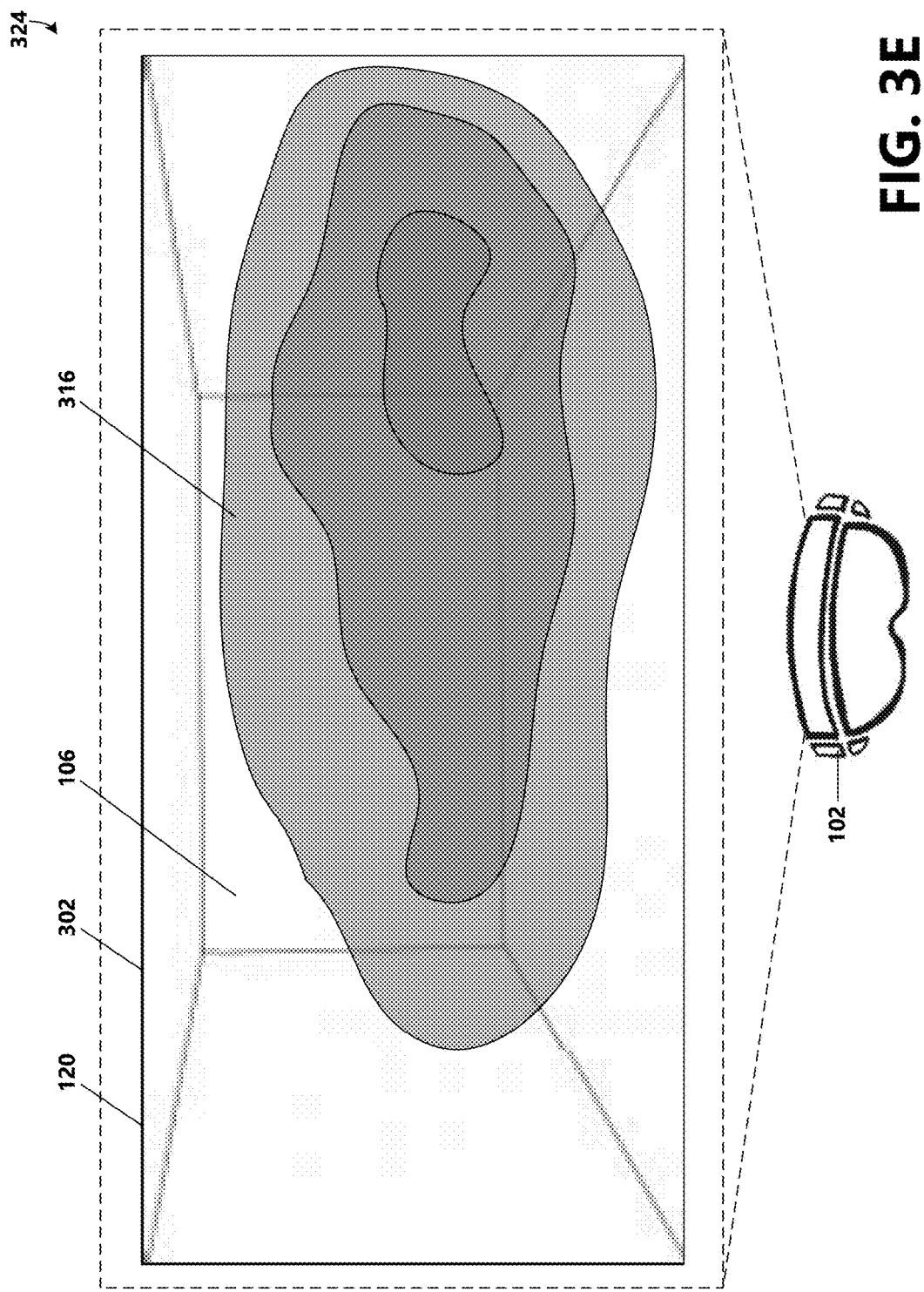
FIG. 3E is an illustration of an example of a 3D signal data visual representation of WiFi signal performance data corresponding to an area of interest.

With reference now to FIG. 3E, an illustration of an example 324 of a 3D signal data visual representation 120 of WiFi signal performance data corresponding to an area of interest 106 is provided. For example, the WiFi signal performance data values are represented as a 3D heatmap 316 in the area of interest 106. In some implementations, the user may utilize a wearable user device 102, such as an augmented reality-enabled device where the 3D signal data visual representation 120 can be displayed as an overlay on a live or virtually-live layout image 302.

Figure 3F:
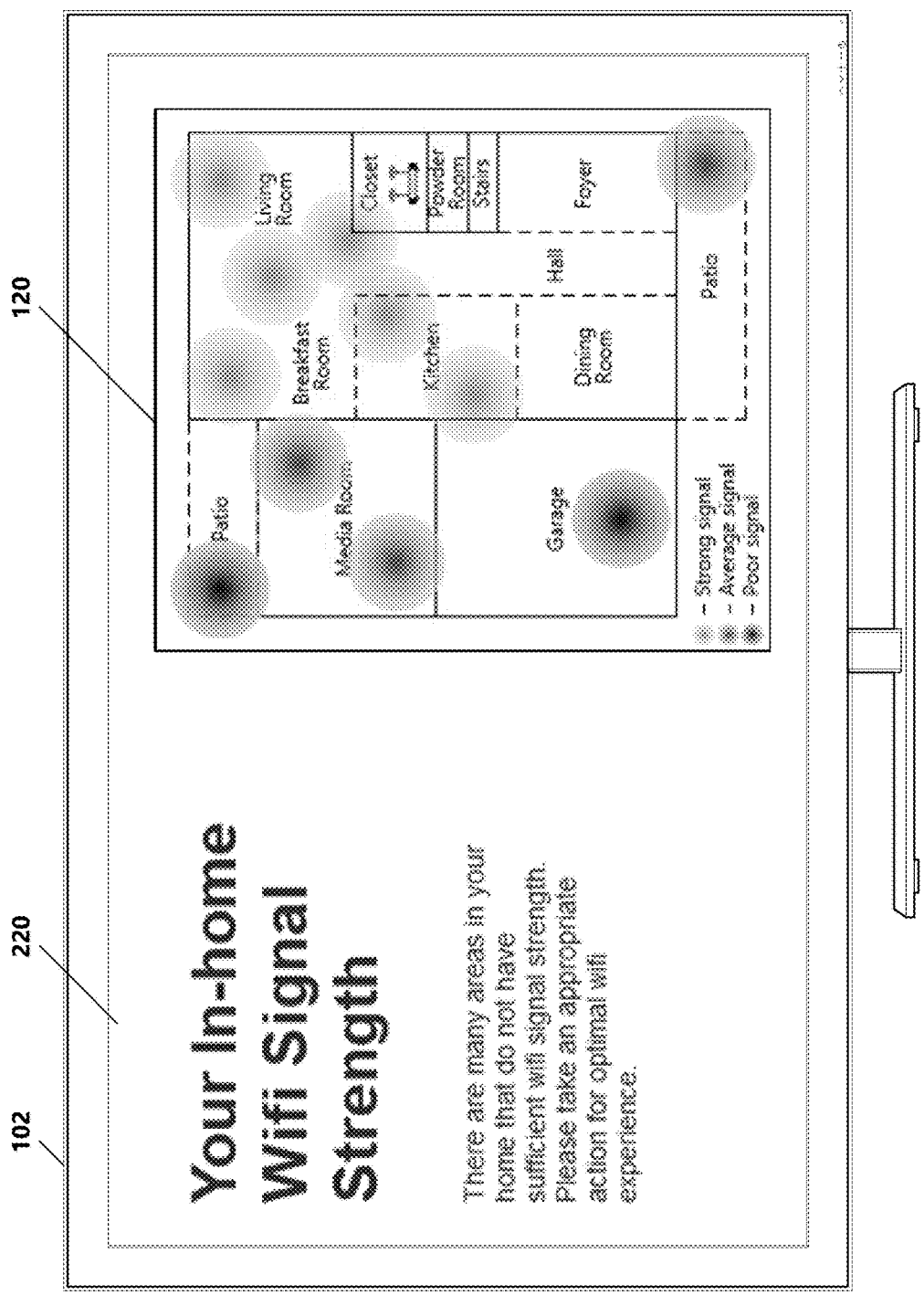
FIG. 3F is an illustration of a signal data visual representation displayed on a display of a user device.

With reference now to FIG. 3F, an illustration of an example signal data visual representation 120 displayed on a display 220 of a user device 102 is provided. According to an example, the signal data visual representation 120 may be automatically presented to the user when an inferior WiFi signal strengths are detected by a user device 102 for supporting a specified activity or operation. For example, the signal data visual representation 120 may be displayed on the user's television screen responsive to receiving an indication of a user selection to stream 4K UHD content on a television (user device 102) located in an area in the area of interest 106 where WiFi signal strengths are measured as average and where signal interference is determined to be likely (e.g., based on other wireless devices or appliances in the area). Given this information, the user can take certain steps to optimize WiFi signal performance in the area of interest 106. For example, the user can select to stream the 4K UHD content on another user device 102, may move the television, or may remove certain interference sources.

Figure 4:
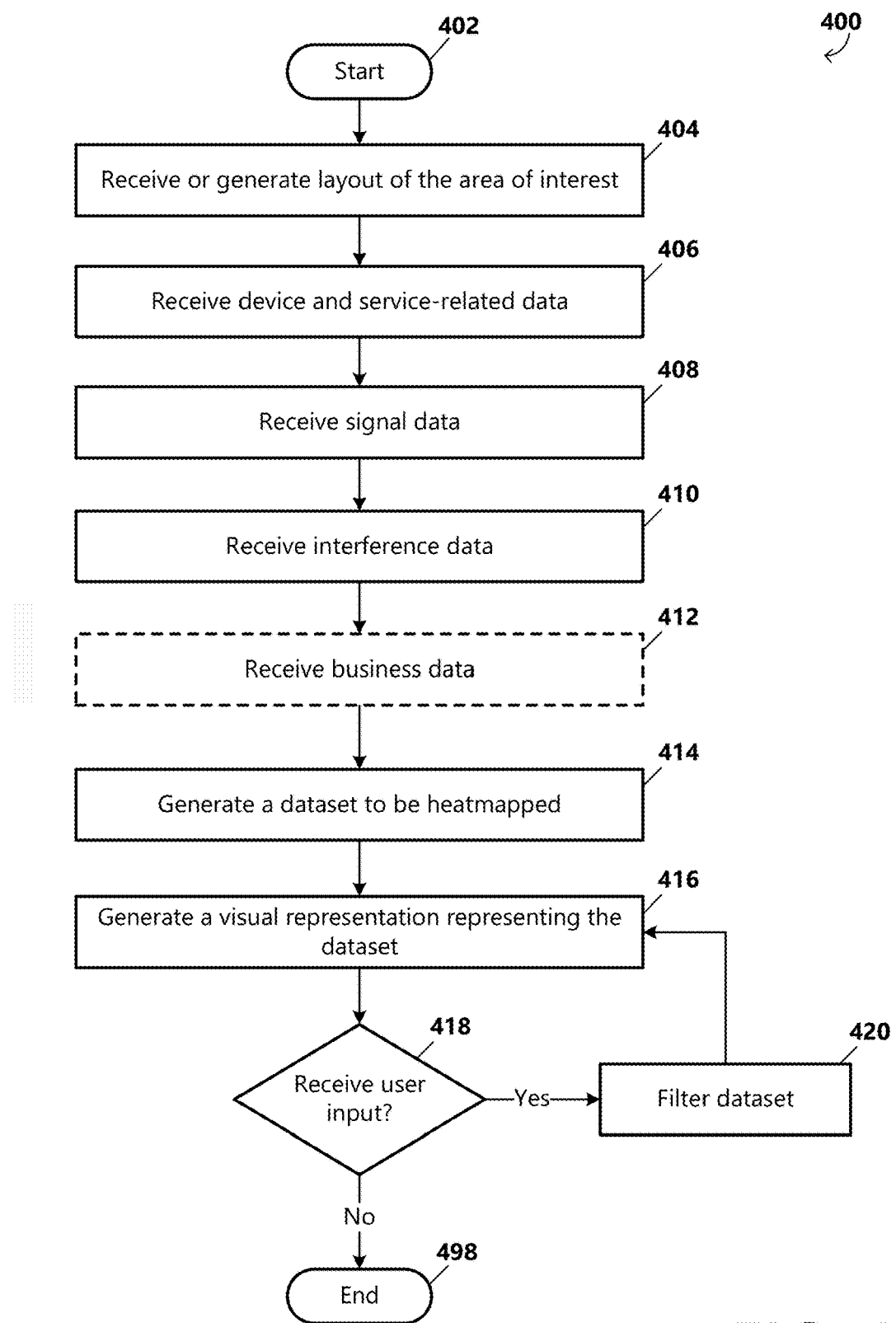
FIG. 4 is a flow diagram depicting general stages of an example process for generating and providing a signal data visual representation of WiFi signal performance data corresponding to an area of interest.

FIG. 4 is a flow diagram that depicts general stages of an example method 400 for generating and providing a signal data visual representation 120 of WiFi signal performance data corresponding to an area of interest 106 according to an embodiment. The method 400 begins at START OPERATION 402, and proceeds to OPERATION 404 where the method 400 uses the area-of-interest mapping engine 202 to receive or generate a layout image 302 of the area of interest 106, and store the layout image in the database 222. For example, the layout image 302 can be provided to the signal data visualization system 104, or the area-of-interest mapping engine 202 can be configured to operate as a floorplan tool that enables the user to create a layout of the area of interest 106 or to modify a preloaded floorplan to correspond to the area of interest.

At OPERATION 406, the method 400 uses the device data collector 204 to receive device-related data, and store the data in the database 222. For example, device-related data (e.g., device identifier, location data, service or application data) can be automatically communicated to the signal data visualization system 104 by one or more user devices 102 in the area of interest 106, can be communicated to the signal data visualization system responsive to a request for device-related data, or can be input or selected by a user via a data entry component of a user interface associated with the signal data visualization system.

At OPERATION 408, the method 400 uses the signal data collector 206 to receive signal data, such as signal strength data measured and provided to the signal data collector by one or more data sources 114 operating as signal data sources, and store the data in the database 222. According to examples, location data associated with locations in the area of interest 106 where the signal strength measurements are recorded can be provided with the signal data.

At OPERATION 410, the method 400 uses the interference data collector 208 to receive interference data from one or more data sources 114, and store the data in the database 222. For example, interference data can include identified and/or measured interference signal data and/or user-input interference information, such as a selection or entry of possible sources of signal interference.

At optional OPERATION 412, the method 400 uses the business data collector 210 to receive business-related data, and store the data in the database 222. For example, the business-related data can indicate information associated with services (e.g., Internet service, video service, security service) provided to the area of interest 106 which can affect the WiFi signal profile of the area of interest.

At OPERATION 414, the method 400 uses the signal profile data visualization engine 212 to analyze the received data and generate a dataset from the data that is representative of the signal profile of the area of interest 106. According to an aspect, the dataset includes value information and location information, wherein value information include those data that are to be displayed in the signal data visual representation 120. In some examples, the dataset includes values of measured WiFi signal strengths. In other examples, the dataset includes values of measured WiFi signal strengths that are weighted based on one or a combination of device data, interference data, and business-related data.

At OPERATION 416, the method 400 uses the signal profile data visualization engine 212 to generate a visual representation 120 of the dataset. For example, the method 400 can use the signal profile data visualization engine 212 to generate a layer encoded with value information from the dataset, wherein a system of color-coding is used to represent the different values, and to overlay the generated layer encoded with value information and correlated color-coding of the value information on the layout image of the area of interest 106 based on location data to develop a combined layout. At OPERATION 416, the method 400 further uses the output engine 216 to transmit the combined layout to a user device 102 for rendering the layout as a signal data visual representation 120 on a display 220 of the device.

At DECISION OPERATION 418, the method 400 uses the user interface engine 218 to determine whether any user input is received. For example, user input can correspond with a request to filter the dataset and update the signal data visual representation 120 based on the filtered dataset. In some examples, the dataset can be filtered responsive to a user selection to display a view of: only measured WiFi signal strengths in the area of interest 106, interference data, weighted signal strength data (e.g., for displaying the adequacy of signal strengths corresponding to particular services provided on particular user devices 102), recommended locations for one or more user devices, etc.

When user input corresponding to a request to filter the dataset is received, the method 400 proceeds to OPERATION 420, where the method uses the user interface engine 218 to provide the user input to the signal profile data visualization engine 212, and further uses the signal profile data visualization engine to filter the dataset based on the user input. The method 400 can then continue to OPERATION 416. If user input is not received at DECISION OPERATION 418, the method ends at OPERATION 498.

Figure 5:
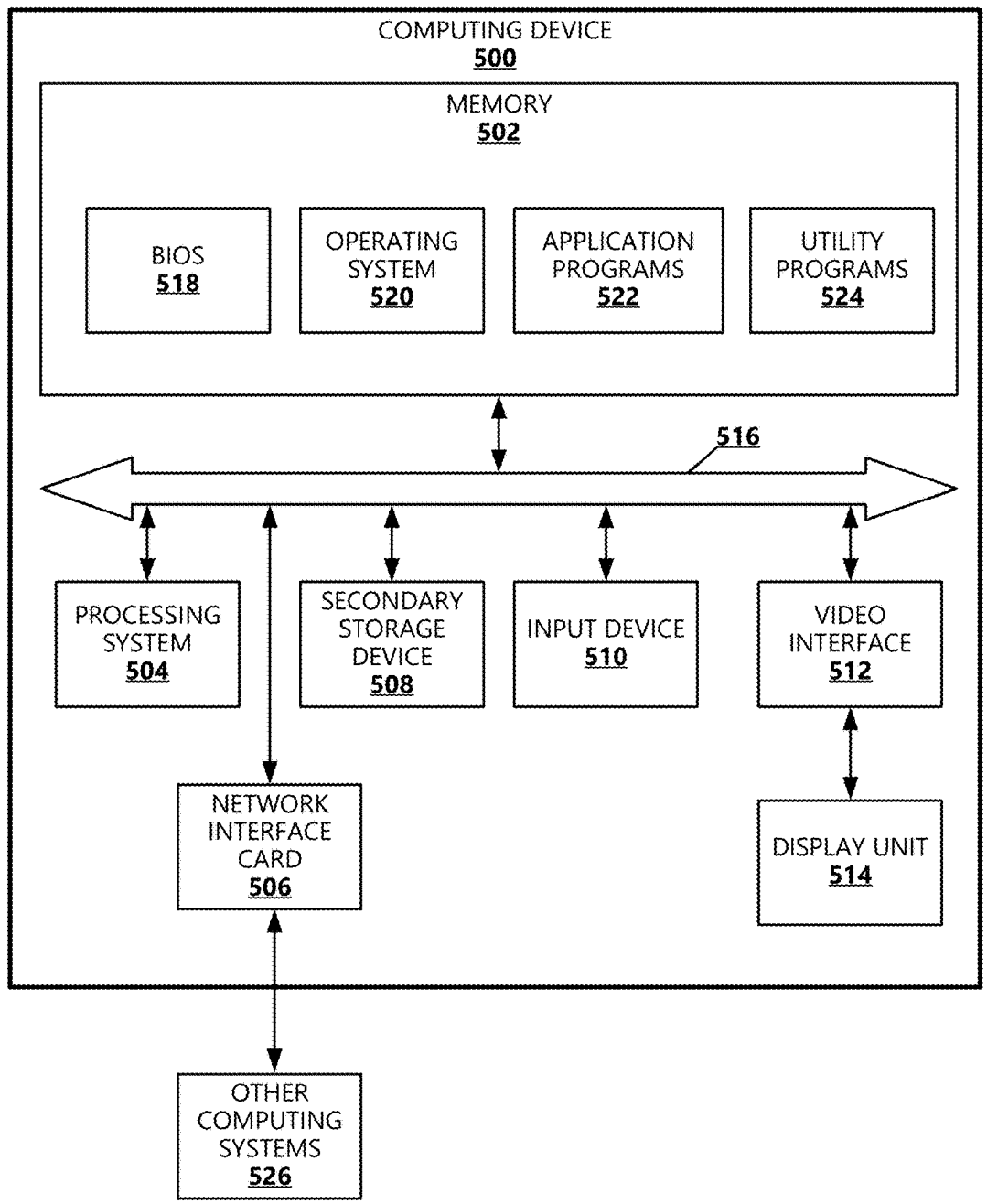
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, cause allocation and/or reallocation operations as part of load balancing internal connections. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 6A, 6B:
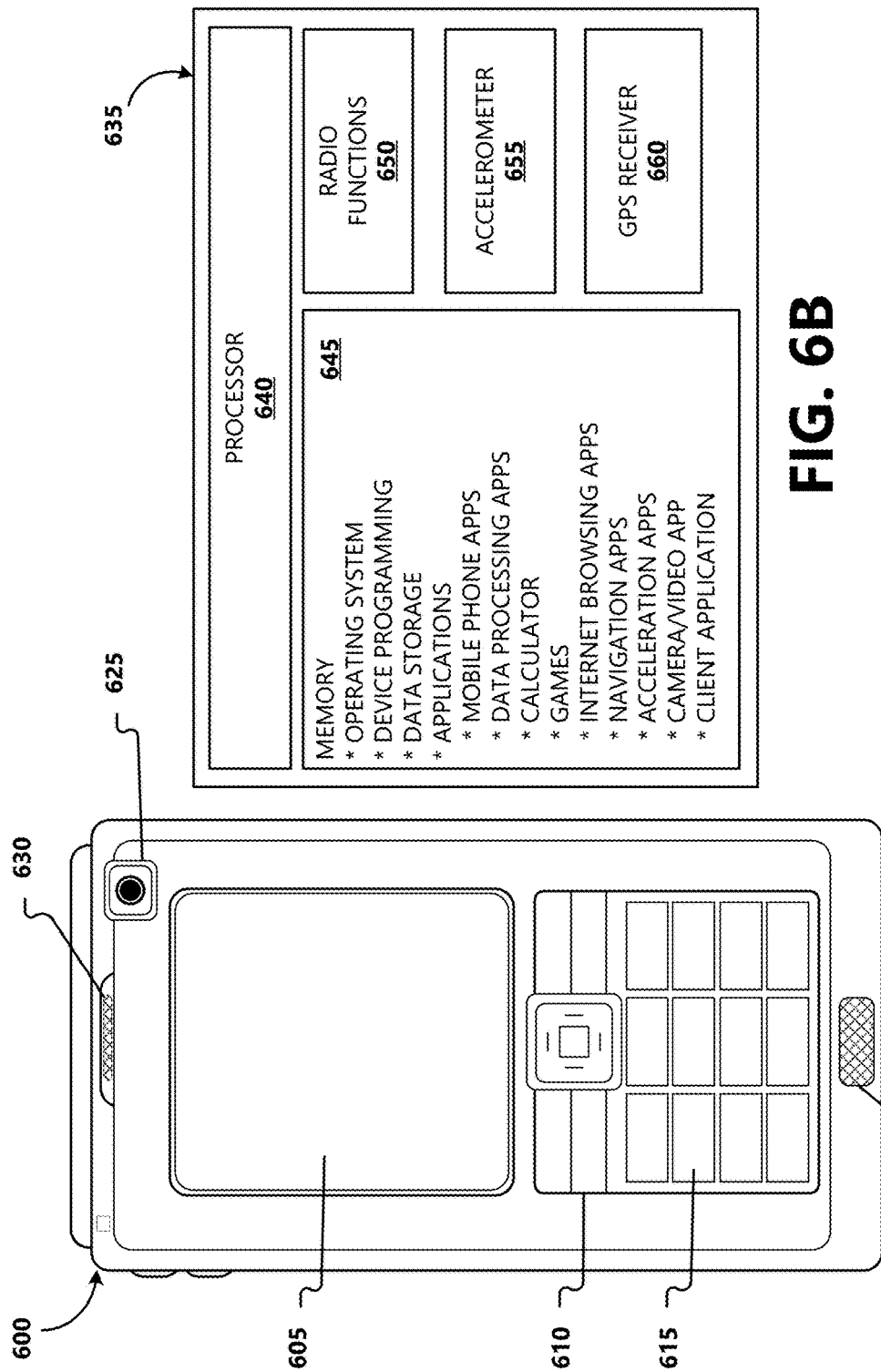
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other user device 102, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

FIG. 7 is a block diagram illustrating a cable television services system 700 (hereafter referred to as "CATV") architecture providing an operating environment according to an aspect. As should be appreciated, a CATV services system 700 is but one of various types of systems that can be utilized for providing Internet services and/or video services to an area of interest 106 as described herein. Referring now to FIG. 7, digital and analog video programming, information content and interactive television services are provided via a hybrid fiber coax (HFC) network 715 to a television set 716 for consumption by a cable television/ services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for generating a visual representation of a WiFi signal profile of an area of interest, the system comprising:
    at least one processor;
    a memory storage that includes:
        an area-of-interest mapping engine that uses the at least one processor to receive a layout image corresponding to the area of interest;
        a device data collector that uses the at least one processor to:
            receive identification of a wireless router in the area of interest;
            receive identification of a user device in the area of interest;
            receive location data associated with a location of the user device; and
            receive identification of at least one wireless service provided by the user device;
        a signal data collector that uses the at least one processor to receive signal data comprising a value of a measured WiFi signal level at the location of the user device;
        a signal profile data visualization engine that uses the at least one processor to:
            generate a dataset comprised of the value of the measured WiFi signal level and the location of the user device;
            apply a weight to the value of the measured WiFi signal level based on an assessed bandwidth level associated with the at least one wireless service provided by the user device;
            correlate a color with the weighted value of the measured WiFi signal level, wherein the color represents a determined adequacy of the measured WiFi signal level for providing the at least one wireless service;

generate a layer including the correlated color representing the weighted value of the measured WiFi signal level positioned at the location of the user device; and overlay the generated layer on the layout image to generate a combined layout; and an output engine that uses the at least one processor to transmit the combined layout to a device for rendering the combined layout as a signal data visual representation on a display of the device, wherein the visual representation indicates whether the measured WiFi signal level is adequate for enabling the user device to provide the at least one wireless service.

2. The system of claim 1, wherein in receiving location data associated with the location of the user device, the device data collector is operative to receive location data from the user device, wherein the user device comprises or is in communication with a GPS system.

3. The system of claim 1, wherein in receiving signal data, the signal data collector is operative to receive signal data from the user device, wherein the user device comprises or is in communication with a signal strength meter and a GPS system.

4. The system of claim 1, wherein the signal data collector is further operative to use the at least one processor to:
receive signal data comprising a plurality of values of a plurality of measured WiFi signal levels at a plurality of locations in the area of interest; and
receive location data associated with the plurality of locations.

5. The system of claim 4, wherein:
the signal profile data visualization engine is further operative to use the at least one processor to:
generate a dataset comprised of the values of the plurality of measured WiFi signal levels and the plurality of locations;
correlate one or more colors with the values of the plurality of measured WiFi signal levels, wherein the one or more colors are associated with specific ranges of WiFi signal strengths;
generate a layer including the correlated one or more colors representing the values of the plurality of measured WiFi signal levels positioned at the plurality of locations in the area of interest where the WiFi signal levels were measured; and
overlay the generated layer on the layout image to generate the combined layout; and
the output engine is further operative to use the at least one processor to transmit the combined layout to the device for rendering the combined layout as the signal data visual representation on the display of the device.

6. The system of claim 5, wherein the signal data visual representation is a heatmap.

7. The system of claim 1, wherein the system further comprises a business data collector that uses the at least one processor to collect business-related data corresponding to at least one of:
a particular Internet service level that is provided to the area of interest, wherein the particular Internet service level is associated with a certain level of bandwidth provided to the area of interest; and
a particular tier of video service that is provided to the area of interest, wherein the particular video service tier is associated with a certain type of content that can be provided to the user device in the area of interest and wherein a certain level of bandwidth is required for providing the certain type of content.

8. The system of claim 7, wherein in applying the weight to the value of the measured WiFi signal level, the signal profile data visualization engine is operative to apply a weight based on the level of bandwidth required for providing the certain type of content to the user device.

9. The system of claim 1, wherein the system further comprises an interference data collector that uses the at least one processor to collect interference data; and
the signal profile data visualization engine is operative to visually represent the interference data in a layer overlaid on the layout image.

10. The system of claim 1, wherein:
the system further comprises a user interface engine that uses the at least one processor to receive user input, wherein the user input is associated with a request for a recommended location for the user device in the area of interest; and
the signal profile data visualization engine is operative to visually represent one or more locations in the area of interest as recommended locations for the user device, wherein the one or more locations are selected based on one or a combination of:
measured WiFi signal levels;
interference data;
device data; and
business-related data.

11. A method for generating a visual representation of a WiFi signal profile of an area of interest, the method comprising:
receiving a layout image corresponding to the area of interest;
receiving identification of a wireless router in the area of interest;
receiving location data associated with a location of the wireless router;
receiving identification of a user device in the area of interest;
receiving location data associated with a location of the user device;
receiving identification of at least one wireless service provided by the user device;
receiving signal data comprising a value of a measured WiFi signal level at the location of the user device;
generating a dataset comprised of the value of the measured WiFi signal level and the location of the user device;
applying a weight to the value of the measured WiFi signal level based on an assessed bandwidth level associated with the at least one wireless service provided by the user device;
correlating a color with the weighted value of the measured WiFi signal level, wherein the color represents a determined adequacy of the measured WiFi signal level for providing the at least one wireless service;
generating a layer including the correlated color representing the weighted value of the measured WiFi signal level positioned at the location of the user device;
overlaying the generated layer on the layout image to generate a combined layout; and
transmitting the combined layout to a device for rendering the combined layout as a signal data visual representation on a display of the device, wherein the visual representation indicates whether the measured WiFi signal level is adequate for enabling the user device to provide the at least one wireless service.

12. The method of claim 11, further comprising:
receiving signal data comprising a plurality of values of a plurality of measured WiFi signal levels at a plurality of locations in the area of interest; and
receiving location data associated with the plurality of locations.

13. The method of claim 12, further comprising:
generating a dataset comprised of the values of the plurality of measured WiFi signal levels and the plurality of locations;
correlating one or more colors one or more colors with the values of the plurality of measured WiFi signal levels, wherein the one or more colors are associated with specific ranges of WiFi signal strengths;
generating a layer including the correlated one or more colors representing the values of the plurality of measured WiFi signal levels positioned at the plurality of locations in the area of interest where the WiFi signal levels were measured;
overlaying the generated layer on the layout image to generate the combined layout; and
transmitting the combined layout to the device for rendering the combined layout as the signal data visual representation on the display of the device.

14. The method of claim 11, further comprising:
collecting business-related data corresponding to at least one of:
a particular Internet service level that is provided to the area of interest, wherein the particular Internet service level is associated with a certain level of bandwidth provided to the area of interest; and
a particular tier of video service that is provided to the area of interest, wherein the particular video service tier is associated with a certain type of content that can be provided to the user device in the area of interest and wherein a certain level of bandwidth is required for providing the certain type of content.

15. The method of claim 14, wherein applying the weight to the value of the measured WiFi signal level comprises applying a weight based on the level of bandwidth required for providing the certain type of content to the user device.

16. The method of claim 11, further comprising:
collecting interference data from one or a plurality of interference data sources; and
visually representing the interference data in a layer overlaid on the layout image.

17. The method of claim 11, further comprising:
receiving user input, wherein the user input is associated with a request for a recommended location for the user device in the area of interest; and
visually representing one or more locations in the area of interest as recommended locations for the user device, wherein the one or more locations are selected based on one or a combination of:
measured WiFi signal levels;
interference data;
device data; and
business-related data.

18. A computer readable storage device that includes executable instructions which, when executed by a processor:
use an area-of-interest mapping engine to receive a layout image corresponding to the area of interest;
use a device data collector to:
receive identification of a wireless router in the area of interest;
receive location data associated with a location of the wireless router;
receive identification of a user device in the area of interest;
receive location data associated with a location of the user device; and
receive identification of at least one wireless service provided by the user device;
use a signal data collector to receive signal data comprising a value of a measured WiFi signal level at the location of the user device;
use a signal profile data visualization engine to:
generate a dataset comprised of the value of the measured WiFi signal level and the location of the user device;
apply a weight to the value of the measured WiFi signal level based on an assessed bandwidth level associated with the at least one wireless service provided by the user device;
correlate a color with the weighted value of the measured WiFi signal level, wherein the color represents a determined adequacy of the measured WiFi signal level for providing the at least one wireless service;
generate a layer including the correlated color representing the weighted value of the measured WiFi signal level positioned at the location of the user device; and
overlay the generated layer on the layout image to generate a combined layout; and
an output engine to transmit the combined layout to a device for rendering the combined layout as a signal data visual representation on a display of the device, wherein the visual representation indicates whether the measured WiFi signal level is adequate for enabling the user device to provide the at least one wireless service.

19. The computer readable storage device of claim 18, wherein the executable instructions, when executed by the processor, further use the signal data collector to:
receive signal data comprising a plurality of values of a plurality of measured WiFi signal levels at a plurality of locations in the area of interest; and
receive location data associated with the plurality of locations.

20. The computer readable storage device of claim 19, wherein the executable instructions, when executed by the processor, further:
use the signal profile data visualization engine to:
generate a dataset comprised of the values of the plurality of measured WiFi signal levels and the plurality of locations;
correlate one or more colors with the values of the plurality of measured WiFi signal levels, wherein the one or more colors are associated with specific ranges of WiFi signal strengths;
generate a layer including the correlated one or more colors representing the values of the plurality of measured WiFi signal levels positioned at the plurality of locations in the area of interest where the WiFi signal levels were measured; and
overlay the generated layer on the layout image to generate the combined layout; and
use the output engine to transmit the combined layout to the user device for rendering the combined layout as the signal data visual representation on the display of the device.

* * * * *